United States Patent [19]
Kent

[11] Patent Number: 5,883,302
[45] Date of Patent: Mar. 16, 1999

[54] PRESSURE TESTING OF ENGINE COMPONENTS HAVING COOLANT FLOW PATHS

[75] Inventor: Lindsay Raymond Kent, Cape Town, South Africa

[73] Assignee: Kent & Swart Investments CC, Cape Town, South Africa

[21] Appl. No.: 765,741

[22] PCT Filed: Jun. 27, 1995

[86] PCT No.: PCT/GB95/01510

§ 371 Date: Apr. 2, 1997

§ 102(e) Date: Apr. 2, 1997

[87] PCT Pub. No.: WO96/00890

PCT Pub. Date: Jan. 11, 1996

[30]     Foreign Application Priority Data

Jun. 28, 1994  [ZA]  South Africa ............................ 94/4643
May 30, 1995  [ZA]  South Africa ............................ 95/4391

[51] Int. Cl.⁶ ..................................................... G01M 3/02
[52] U.S. Cl. ............................ 73/49.7; 73/49.8; 73/119 R
[58] Field of Search .................... 73/49.7, 49.8, 73/47, 119 R

[56]     References Cited

U.S. PATENT DOCUMENTS 4,030,258  6/1977  Anders ...................................... 52/208
4,171,636  10/1979  Bergeron ................................... 73/49.7
4,617,824  10/1986  Cybulski et al. ......................... 73/49.7
4,860,575  8/1989  Robinson .................................. 73/49.7
5,095,738  3/1992  Roeschlaub .............................. 73/49.7

FOREIGN PATENT DOCUMENTS 0122551  10/1984  European Pat. Off. ................ 73/49.7

OTHER PUBLICATIONS

Brochure: PMD Piccinotti PT120 pressure tester (undated).
Brochure: QUELO pressure tester (undated).

*Primary Examiner*—Michael Brock
*Attorney, Agent, or Firm*—Pillsbury Madison & Sutro LLP

[57]     ABSTRACT

An engine component of the type having a cavity therein through which cooling water can circulate, there being ports which lead from a face of the engine component into the cavity, is pressure tested by closing the ports and by pressing port closing elements onto the face so as to blank off the ports. The cavity is then pressurised and the engine component observed for seepage of water or the appearance of bubbles. The port closing elements are pressed onto the face by means of a transparent, laminated glass plate which is held in a steel frame by means of an elastomeric adhesive. Between the glass plate and a pressure bearing face of the steel frame there is a layer of elastomeric material.

12 Claims, 3 Drawing Sheets

PRESSURE TESTING OF ENGINE COMPONENTS HAVING COOLANT FLOW PATHS

THIS INVENTION relates to pressure testing.

More particularly, it relates to a method of and apparatus for pressure testing engine components of the type having a cavity therein through which cooling water can circulate, there being ports which lead from a face of the engine component into the cavity. The cylinder head of a water-cooled internal combustion engine is an example of such a component.

Engine components of this type can be pressure tested by closing the ports and then establishing a pressure differential between the inside and outside of the cavity. If there are any cracks in the engine component, water or air that is used to pressurise the cavity will escape through the cracks and this can then be detected, for example, by inspecting the engine component for seepage in the event that water is used to pressurise the cavity, or by immersing the engine component in a bath of water or by wetting the outside thereof with a soapy solution in the event that air is used to pressurise the cavity.

U.S. Pat. No. 4,617,824 discloses a method of pressure testing engine components in which the ports are blanked off by port closing elements which are pressed onto the face of the engine component by means of a plexiglass pressure plate. Plexiglass is a synthetic plastics material. A disadvantage of using plexiglass is that when it is subjected to stress it tends to become milky as a result of microscopic cracks developing in the material. As a consequence it becomes opaque, making it difficult clearly to view the engine component through the plate.

According to the present invention there is provided a method of pressure testing an engine component of the type having a cavity therein through which cooling water can circulate, there being ports which lead from a face of the engine component into the cavity, which method comprises, in respect of each of the ports, closing the port by pressing a port closing element onto the face so as to blank off the port, and thereupon establishing a pressure differential between the inside and outside of the cavity, the port closing elements being pressed onto the face by means of a transparent glass plate.

The glass plate may be a laminated glass plate, comprising two or more layers of glass.

The glass of the glass plate, whether in a single layer or laminated, may be toughened glass, ie the type of glass that is used for the windscreens of modern motor vehicles.

The glass plate may be pressed onto the port closing elements via a steel frame, there being a layer of elastomeric material between a load bearing face of the steel frame and the glass plate.

Further according to the invention there is provided apparatus for testing an engine component of the type having a cavity therein through which cooling water can circulate, there being ports which lead from a face of the engine component into the cavity, which apparatus comprises means for supporting the engine component, port closing elements for blanking off the ports, and a transparent glass plate for pressing the port closing elements onto the face.

The glass plate may be a laminated glass plate, comprising two or more layers of glass, and may be held in a steel frame extending peripherally of the glass plate.

There may be a layer of elastomeric material between a load bearing face of the frame and the glass plate.

The glass plate may be held in the steel frame by means of an elastomeric adhesive.

The invention extends to a pressure plate for use in the method defined above, the pressure plate comprising a glass plate which is mounted in a steel frame, and there being a layer of elastomeric material between a load bearing face of the steel frame and the glass plate.

The invention will now be described in more detail, by way of example, with reference to the accompanying drawings.

Figure 1:
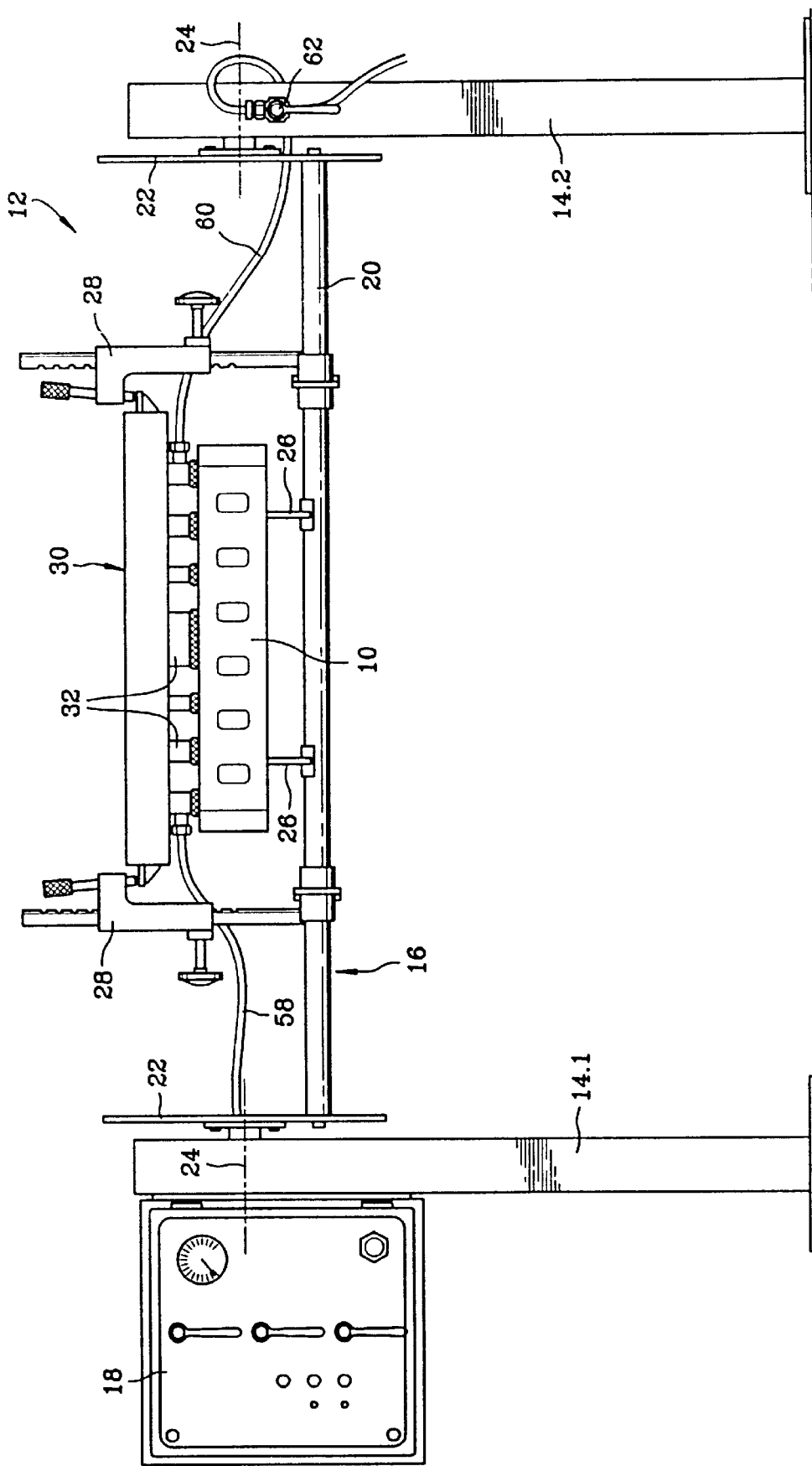
FIG. 1 is a side view of apparatus for testing engine components in accordance with the invention.
Figure 2:
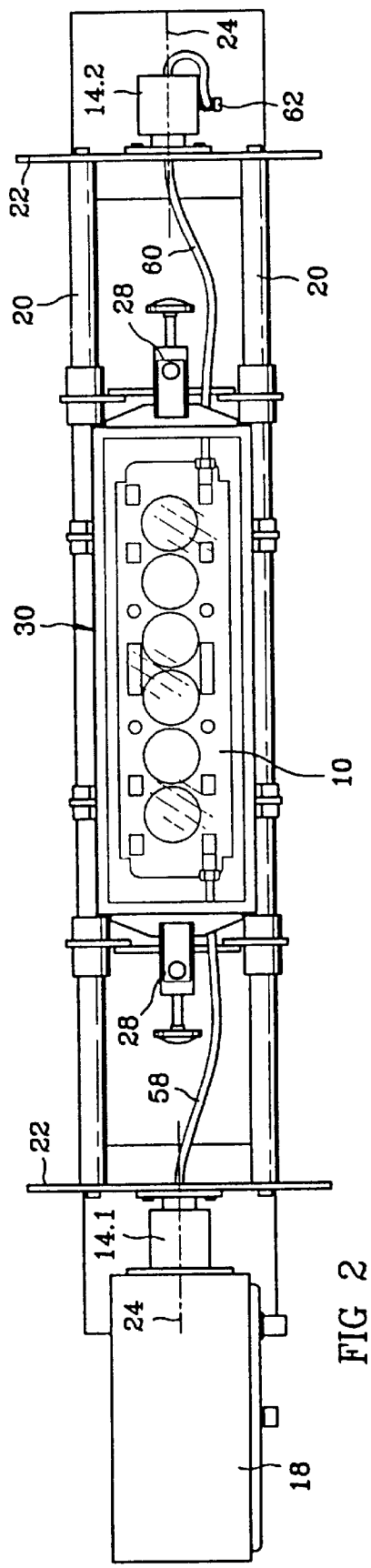
FIG. 2 is a plan view of the apparatus.
Figure 3:
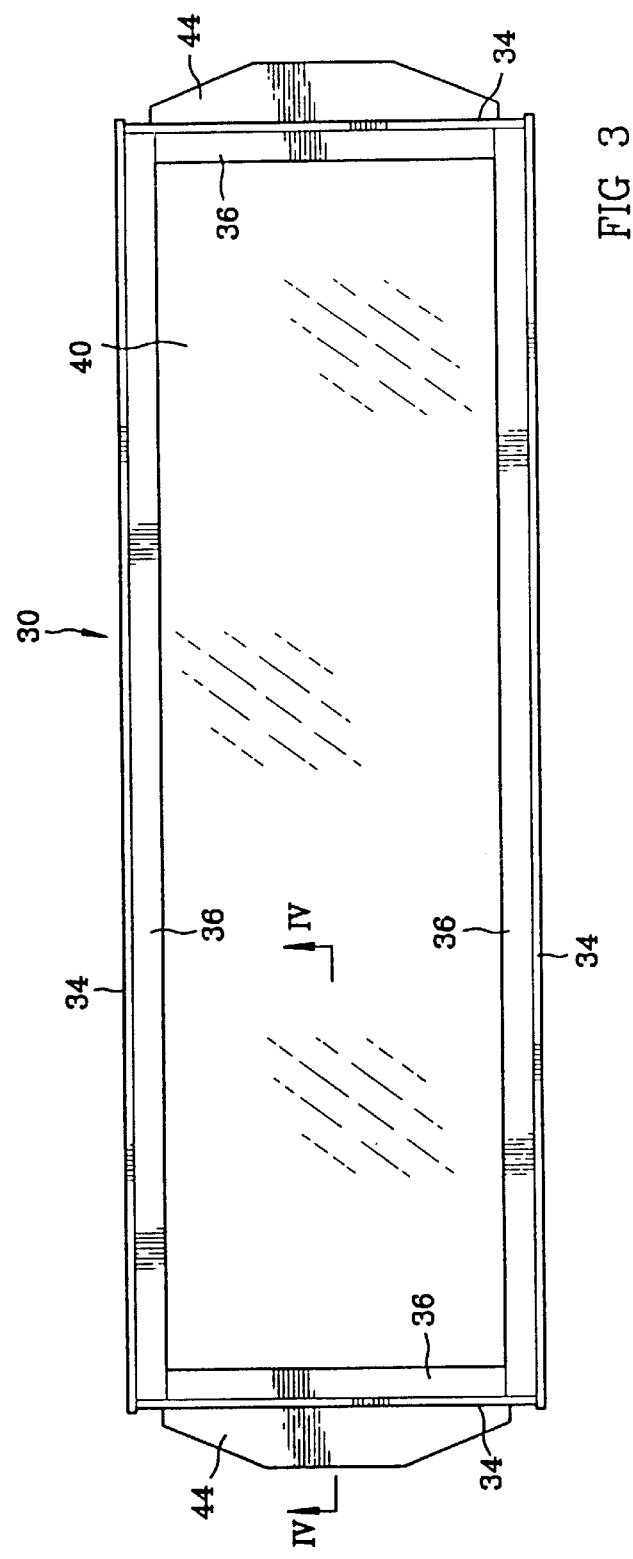
FIG. 3 is a plan view of a pressure plate used in the apparatus.
Figure 4:
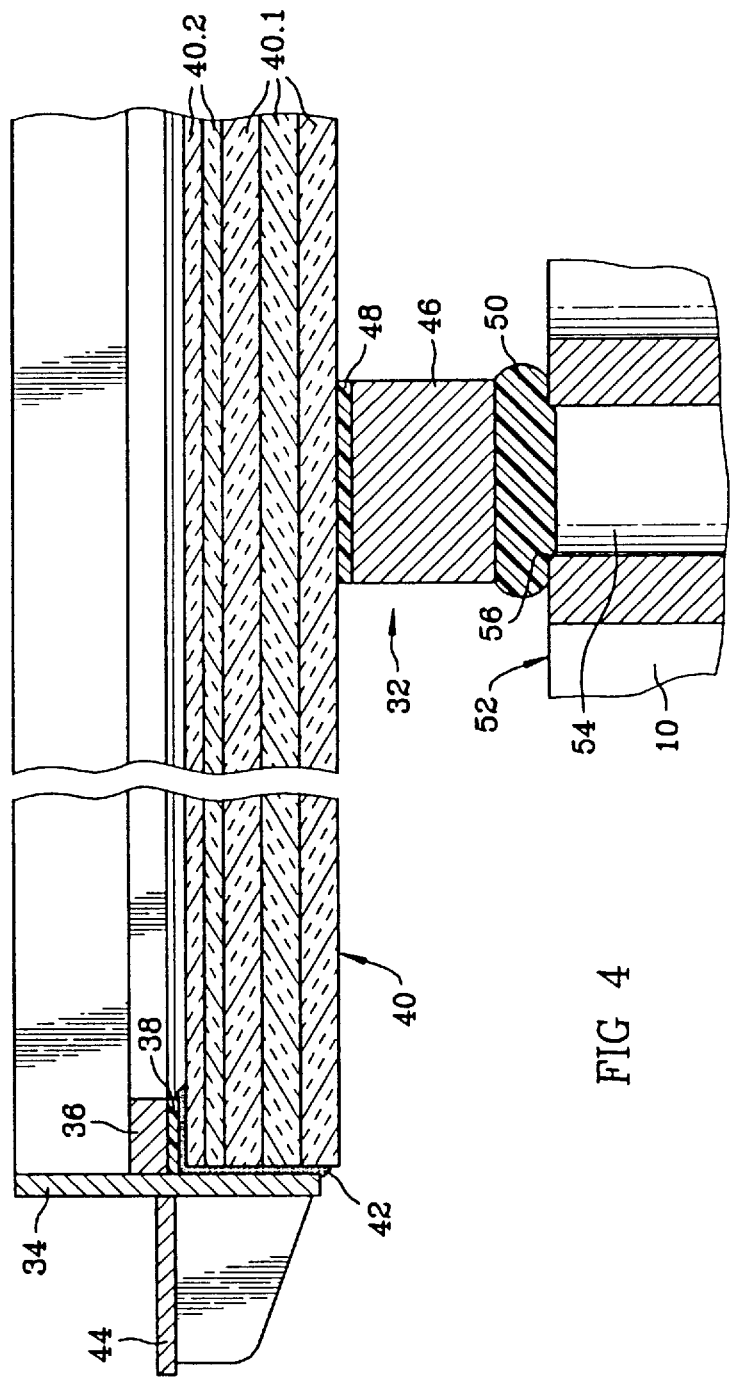
FIG. 4 is a section on IV—IV in FIG. 3, drawn to a larger scale.

Referring now to the drawings in more detail, reference numeral 10 indicates an engine component which is clamped in apparatus generally designated 12, for testing the engine component. The apparatus 12 comprises a pair of posts 14.1 and 14.2, a rotor 16 between the posts, and an instrument and control console 18 which is mounted on the post 14.1.

The rotor 16 comprises a pair of spaced parallel bars 20 which, at each opposite end thereof, are secured to a round end plate 22. The rotor 16 is mounted in bearings on the posts 14.1 and 14.2, so as to be rotatable about an axis of rotation 24.

The engine component 10 rests on the bars 20 via a pair of saddles 26. The apparatus 12 further comprises a pair of clamps 28 whereby a pressure plate 30 is clamped down on the engine component via a series of port closing elements 32.

The pressure plate 30, comprises a rectangular steel frame 34 which, on the inside thereof, has an internal flange 36 welded thereto. On the underside of the flange 36, which forms a load bearing surface, there is a strip 38 of elastomeric material. Spanning the opening of the frame there is a laminated glass plate 40 which comprises three relatively thick layers 40.1 each of 8mm toughened glass and two relatively thin layers 40.2 each of 4mm toughened glass, the layers 40.2 being on the side closest to the flange 36. The composite glass plate 40 is held in place in the frame 34 by means of a silicone adhesive 42 which is between the face of the glass plate and the rubber strip 38, and also between the edges of the glass plate and the frame 34. At each end of the pressure plate 30 there is a bracket 44 via which the clamps 28 can bear on the pressure plate.

Each of the port closing elements 32 comprises a metal body 46 which has, on one end face thereof (the end face which, in use, makes contact with the glass plate 40) a thin layer 48 of elastomeric material and, on the other end face thereof a relatively thick layer of elastomeric material 50.

In the example illustrated, the engine component 10 is in the form of a cylinder head of a water-cooled internal combustion engine. It has a flat face 52 (ie the face which, in the assembled condition of the engine, will seat via the engine's head gasket on the engine block). It further has a cavity 54 therein, the cavity forming a cooling jacket through which cooling water can circulate. There are a number of ports 56 which lead into the cavity 54 and which, in the assembled condition of the engine, place the cooling jacket in communication with the cooling jacket of the engine block.

In use, the cylinder head 10 is placed on the saddles 26, with the face 52 facing upwardly. In respect of each of the ports 56, one of the port closing elements 32 is placed in position so as to blank off the port. Once all the port closing elements 32 have been placed in position, the pressure plate 30 is placed on top of the port closing elements and the pressure plate then clamped down on the cylinder head 10.

Two of the port closing elements 32 are special in that they have, on the side thereof, a pipe connector and a passage therein which leads from the pipe connector through the pad of elastomeric material 50. One of the special port closing elements 32 is arranged at one end of the cylinder head 10 and has a flexible pipe 58 connected thereto. The other one of the special port closing elements 32 is arranged at the other end of the cylinder head 10 and has a pipe 60 connected thereto. The pipe 58 leads from the console 18, and the pipe 60 leads via a shut off valve 62 to waste.

In use, the temperature of the cylinder head 10 can be controlled by passing water of the appropriate temperature through the cylinder head, with the shut off valve 62 being open. Thus, the cylinder head 10 can be heated up and cooled cyclically, to simulate actual operating conditions. Heating of the water can, for example, be effected by means of an in-line electric water heater located in the console 18.

The cavity 54 can also be pressurized. This is done by closing the valve 62 and increasing the pressure of the water that is fed into the cavity 54 via the flexible pipe 58. Cracks in the cylinder head 10 can be detected by observing the cylinder head through the glass plate 40. If there are any cracks, moisture will seep through them and this can be seen through the glass plate. Alternatively, the cavity can be pressurised by means of compressed air. In this event the engine component can be immersed in a bath of water or a soapy solution applied to the outside surface thereof, and the cylinder head then observed through the glass plate for the appearance of bubbles.

It is an advantage of using a plate of toughened glass that it can withstand high pressures without its transparency being affected, as is the case with synthetic plastics materials which tend to become milky through microscopic cracks developing in the material when subjected to excessive pressure. By mounting the glass plate 40 in a steel frame by means of a silicone adhesive and with there being an elastomeric strip between the glass plate and the pressure bearing face of the frame, high pressures can be applied to the plate without the risk of the plate cracking.

I claim:

1. A method of pressure testing an engine component of the type having a cavity therein through which cooling water can circulate, there being ports which lead from a face of the engine component into the cavity, which method comprises, in respect of each of the ports, closing the port by pressing a port closing element onto the face so as to blank off the port, and thereupon establishing a pressure differential between inside and outside of the cavity, and wherein the port closing elements are pressed onto the face by means of a transparent glass plate the glass plate being pressed onto the port closing elements via a frame there being a layer of elastomeric material between a load bearing face of the frame and the glass plate.

2. A method as claimed in claim 1, wherein the glass plate is a laminated glass plate, comprising two or more layers of glass.

3. A method as claimed in claim 1 or claim 2, wherein the glass of the glass plate is toughened glass.

4. Apparatus for testing an engine component of the type having a cavity therein through which cooling water can circulate, there being ports which lead from a face of the engine component into the cavity, which apparatus comprises means for supporting the engine component, port closing elements for blanking off the ports, and a pressure plate for pressing the port closing elements onto the face and wherein the pressure plate comprises a transparent glass plate which is held by a frame extending peripherally of the glass plate, there being a layer of elastomeric material between a load bearing face of the frame and the glass plate.

5. Apparatus as claimed in claim 4, wherein the glass plate is a laminated glass plate, comprising two or more layers of glass.

6. Apparatus as claimed in claim 4 or claim 5, wherein the glass of the glass plate is toughened glass.

7. Apparatus as claimed in claim 4, wherein the glass plate is held in the frame by means of an elastomeric adhesive.

8. A method of pressure testing an engine component of the type having a cavity therein through which cooling water can circulate, there being ports which lead from a face of the engine component into the cavity, which method comprises, in respect of each of the ports, closing the port by pressing a port closing element onto the face so as to blank off the port, and thereupon establishing a pressure differential between the inside and outside of the cavity, the port closing elements being pressed onto the face by means of a transparent plate which is held by a frame extending peripherally of said plate.

9. Apparatus for testing an engine component of the type having a cavity therein through which cooling water can circulate, there being ports which lead from a face of the engine component into the cavity, which apparatus comprises means for supporting the engine component, port closing elements for blanking off the ports, and a plate for pressing the port closing elements onto the face, said plate being of a transparent material and being held by a frame extending peripherally of the plate.

10. Apparatus as claimed in claim 9, wherein the frame is a steel frame.

11. Apparatus as claimed in claim 9, wherein there is a layer of elastomeric material between a load bearing face of the frame and said plate.

12. Apparatus as claimed in claim 9, wherein said plate is held in the frame by means of an elastomeric adhesive.

\* \* \* \* \*